US011115069B2

(12) United States Patent
Gommé et al.

(10) Patent No.: US 11,115,069 B2
(45) Date of Patent: Sep. 7, 2021

(54) NEAR-FIELD WIRELESS DEVICE FOR DISTANCE MEASUREMENT

(71) Applicant: NXP B.V., Eindhoven (NL)

(72) Inventors: Liesbeth Gommé, Anderlecht (BE); Anthony Kerselaers, Herselt (BE)

(73) Assignee: NXP B.V., Eindhoven (NL)

( * ) Notice: Subject to any disclaimer, the term of this patent is extended or adjusted under 35 U.S.C. 154(b) by 113 days.

(21) Appl. No.: 16/752,403

(22) Filed: Jan. 24, 2020

(65) Prior Publication Data

US 2021/0234563 A1 Jul. 29, 2021

(51) Int. Cl.
*H04B 1/04* (2006.01)
*H04B 5/00* (2006.01)

(52) U.S. Cl.
CPC ......... *H04B 1/0475* (2013.01); *H04B 5/0025* (2013.01)

(58) Field of Classification Search
CPC ............................. H04B 1/0475; H04B 5/0025
See application file for complete search history.

(56) References Cited

U.S. PATENT DOCUMENTS

| | | | |
|---|---|---|---|
| 6,545,464 B1 * | 4/2003 | Tigges ............... | H03K 17/9505 324/207.12 |
| 8,710,966 B2 | 4/2014 | Hill | |
| 8,970,501 B2 | 3/2015 | Hotelling et al. | |
| 9,881,277 B2 | 1/2018 | Brady | |
| 10,601,467 B1 * | 3/2020 | Gomme ............... | H04B 5/0012 |
| 10,917,773 B1 * | 2/2021 | Kerselaers ........... | H04B 5/0056 |
| 10,992,392 B2 * | 4/2021 | Gomme ............... | H04B 13/005 |
| 11,038,556 B1 * | 6/2021 | Kerselaers ........... | H04B 5/0081 |
| 2008/0109190 A1 * | 5/2008 | Bauer ................. | B60R 21/0136 702/189 |
| 2010/0245197 A1 * | 9/2010 | Kerselaers ........... | H01Q 13/085 343/767 |
| 2011/0176339 A1 * | 7/2011 | Kerber ................ | H01L 25/0657 363/21.18 |
| 2013/0030931 A1 * | 1/2013 | Moshfeghi .............. | H04W 4/80 705/16 |

(Continued)

FOREIGN PATENT DOCUMENTS

JP 2017-182907 A 10/2017

OTHER PUBLICATIONS

U.S. Appl. No. 16/439,884; not yet published; 38 pages (dated Jun. 13, 2019).

(Continued)

*Primary Examiner* — Lewis G West (57) ABSTRACT

One example discloses a wireless device, including: a first near-field device, including a near-field transmitter or receiver and a controller, configured to be coupled to a near-field antenna having a first conductive surface and a set of feed-points; wherein the controller is configured to receive a transmitter output voltage from the set of feed-points; wherein the controller is configured to generate a correction signal based on a difference between the transmitter output voltage and a target transmitter output voltage; wherein the correction signal varies in response to a change in a distance between the first surface and a second conductive surface; and wherein the controller is configured to calculate the distance, between the first conductive surface and the second conductive surface, based on the correction signal.

18 Claims, 7 Drawing Sheets

(56) References Cited

U.S. PATENT DOCUMENTS

| | | | |
|---|---|---|---|
| 2013/0084801 A1* | 4/2013 | Royston | H04B 5/0043 455/41.1 |
| 2014/0049422 A1* | 2/2014 | Von Novak | H02J 7/025 342/146 |
| 2016/0158942 A1* | 6/2016 | Augenbraun | B25J 9/1694 700/253 |
| 2016/0032091 A1 | 11/2016 | Fang et al. | |
| 2018/0261914 A1* | 9/2018 | Kerselaers | H01Q 1/273 |
| 2018/0316229 A1* | 11/2018 | Anwer | H04B 5/0081 |
| 2018/0331429 A1* | 11/2018 | Kornaros | H02J 50/27 |
| 2020/0006851 A1* | 1/2020 | Kerselaers | H01Q 7/005 |
| 2020/0083962 A1* | 3/2020 | Gomme | H04B 5/0031 |
| 2020/0106170 A1* | 4/2020 | Kerselaers | H04R 1/1016 |
| 2021/0055134 A1* | 2/2021 | Gomme | H04B 5/0081 |

OTHER PUBLICATIONS

U.S. Appl. No. 16/545,207; not yet published; 37 pages (dated Aug. 20, 2019).

* cited by examiner

NEAR-FIELD WIRELESS DEVICE FOR DISTANCE MEASUREMENT

The present specification relates to systems, methods, apparatuses, devices, articles of manufacture and instructions for near-field wireless devices.

SUMMARY

According to an example embodiment, a wireless device, comprising: a first near-field device, including a near-field transmitter or receiver and a controller, configured to be coupled to a near-field antenna having a first conductive surface and a set of feed-points; wherein the controller is configured to receive a transmitter output voltage from the set of feed-points; wherein the controller is configured to generate a correction signal based on a difference between the transmitter output voltage and a target transmitter output voltage; wherein the correction signal varies in response to a change in a distance between the first surface and a second conductive surface; and wherein the controller is configured to calculate the distance, between the first conductive surface and the second conductive surface, based on the correction signal.

In another example embodiment, the correction signal increases when the distance between the first surface and the second surfaces decreases; and the correction signal decreases when the distance between the first surface and the second surfaces increases.

In another example embodiment, the controller is configured to adjust the transmitter output voltage based on the correction signal.

In another example embodiment, the first conductive surface is configured to be coupled to a user's body and the second conductive surface is embedded in a device not on the user's body.

In another example embodiment, the second conductive surface is not coupled to any other near-field device.

In another example embodiment, the controller calculates the distance without transmitting or receiving data to or from any other near-field device coupled to the second conductive surface.

In another example embodiment, the near-field device hosts non-propagating quasi-static electric near-field signals; and the first conductive surface is configured to conduct the non-propagating quasi-static electric near-field signals.

In another example embodiment, the near-field device is configured to transmit or receive a near-field electro-induction (NFEI) signal; and the near-field transmitter or receiver is configured to either set the near-field resonance frequency or the operational bandwidth of the NFEI signal.

In another example embodiment, the near-field transceiver is configured to transmit or receive a near-field electro-magnetic induction (NFEMI) signal; and the near-field transmitter or receiver is configured to either set the near-field resonance frequency or the operational bandwidth of the NFEMI signal.

In another example embodiment, the first conductive surface is embedded in either a user's body, a vehicle, a game controller, or a robot.

In another example embodiment, the first conductive surface is a position on or proximate to an assembly line.

In another example embodiment, the controller is configured to record a set of the distances within a time period; and the controller is configured to output an authentication signal if the set of distances corresponds to a stored set of distances.

In another example embodiment, the authentication signal at least one of: activates an electronic device, permits entry to a secure space, indicates that a procedure has been correctly followed, and/or indicates that a quality assurance procedure has been performed.

In another example embodiment, the controller is configured to generate an acoustic signal having an amplitude and/or frequency modulated by the distance.

In another example embodiment, the controller is configured to generate a haptic signal having an amplitude, frequency and/or pattern thereof modulated by the distance.

In another example embodiment, the haptic signal is generated in response to a magnitude of the tuning values exceeding a threshold magnitude.

In another example embodiment, the tuning values include an adjustable capacitance configured to set a near-field resonance frequency of the first near-field device.

In another example embodiment, the tuning values include an adjustable resistance configured to set a transmitter or receiver bandwidth of the first near-field device.

The above discussion is not intended to represent every example embodiment or every implementation within the scope of the current or future Claim sets. The Figures and Detailed Description that follow also exemplify various example embodiments.

Various example embodiments may be more completely understood in consideration of the following Detailed Description in connection with the accompanying Drawings.

While the disclosure is amenable to various modifications and alternative forms, specifics thereof have been shown by way of example in the drawings and will be described in detail. It should be understood, however, that other embodiments, beyond the particular embodiments described, are possible as well. All modifications, equivalents, and alternative embodiments falling within the spirit and scope of the appended claims are covered as well.

DETAILED DESCRIPTION

Herein discussed are near-field interactions between a near-field device on a user's body, for example, and other conductive surfaces and/or other wireless networked devices (e.g. Internet of Things (IoT) devices) based on either near-field electromagnetic induction (NFEMI), where the transmitter and receiver are coupled by both magnetic (H) and electric (E) fields, or near-field electrostatic induction (NFEI), where the transmitter and receiver are coupled by just electric (E) fields. While RF wireless communication is accomplished by propagating an RF plane wave through free space, NFEMI and NFEI communication utilizes non-propagating quasi-static H and/or E fields.

An H-field antenna (i.e. magnetic antenna) is primarily sensitive to magnetic fields and/or primarily initiates magnetic fields when driven by a current. Any E-field component from an H-field antenna is strongly reduced (e.g. −20 to −60 dB reduction, a factor of 0.1 to 0.0008 (10% to 0.08%) depending on the antenna design).

A small loop antenna is an example H-field antenna and includes a loop antenna with dimensions much smaller than the wavelength of its use. The small loop antenna does not resonate at the NFEMI carrier frequency but is instead tuned to resonance by an external reactance. In some example embodiments the current in the small loop antenna has in every position of the loop the same value.

An E-field antenna (i.e. electric antenna) is primarily sensitive to electric fields and/or primarily initiates electric fields when driven by a voltage. Any H-field component from an E-field antenna is strongly reduced (e.g. −20 to −60 dB reduction, a factor of 0.1 to 0.0008 (10% to 0.08%) depending on the antenna design).

A short loaded dipole antenna is an example E-field antenna and includes a short dipole with dimensions much smaller than the NFEMI carrier frequency and in some example embodiments has extra capacitance surfaces at both ends.

The quasi-static characteristic of these fields is a result of the NFEMI antenna dimensions in combination with their carrier frequencies. Most of the near-field energy is stored in the form of magnetic and electric fields, while a small amount of RF energy inevitably propagates in free space. Small antenna geometries minimize radiating waves in free space.

Some body held or worn devices, such as game controllers, medical devices, hearing aids and wireless earbuds, may also employ Near-Field Magnetic Induction (NFMI) as a wireless communication method. In NFMI wireless communication, two loosely coupled coils realize signal transfer. No radiation of radio waves takes place. A current flowing in the transmission coil generates a H-field which in turn induces a current in the receiving coil. In this way, wireless communication is accomplished. Unfortunately, H-field based NFMI systems with small antenna coils have a limited range that may be much smaller than an entire wearable user's body. Such H-field communications are sensitive to coil orientation.

Other body held or worn devices employ Near-field Electric Induction (NFEI)) as a wireless communication method. NFEI allows electronic devices on and near a conductive surface (e.g. a human body) to exchange information through E-field coupling (e.g. at 21 MHz). NFEI is also sometimes called Body Coupled Communication (BCC). While E-field based NFEI signals can have a greater range than H-field based NFMI signals, the E-field signal strength can vary with regard to body posture and is sensitive to body movements. The body can even partially block a capacitive return path, thereby increasing E-field channel loss and reliable and robust wireless communication is not possible.

In various operational settings a distance between such wireless and/or wearable near-field devices with respect to various other conductive surfaces in an environment or other near-field devices can be useful.

Now discussed are example near-field wireless devices that measure changes in the device's own internal tuning values when the near-field wireless device is sufficiently close to a conductive medium (e.g. a conductive surface).

Discussed below are near-field wireless devices that makes use of the near-field coupling mechanisms (electrical and magnetic) to various surfaces, some of which are conductive, using the near-field device's own internal tuning values.

The near-field device's tuning values include a correction signal based on a difference between the near-field device's transmitter output voltage and a target transmitter output voltage. While changes in capacitive bank (C-bank) adjustments for keeping the device's resonance frequency stable, and resistive bank (R-bank) adjustments for keeping the device's operational bandwidth/quality factor stable could also be used to calculate distance, use of the correction signal is several times faster.

The correction signal based on the difference between the near-field device's transmitter output voltage and the target transmitter output voltage approach is faster since only one transmitter output voltage measurement at one frequency is needed in order for the correction signal to adjust transmitter output voltage back to its target transmitter output voltage value. In contrast, C-bank/R-bank tuning may take three measurements.

Changes in the tuning values are mapped to various movements (e.g. approaching or moving away from) of the near-field wireless devices with respect to various conductive surfaces and/or to each other, some of which may be worn by a user who's movements need to be carefully tracked as the user approaches and moves away from various objects in an environment (see below for example applications of this technique). In some example embodiment, the transmitter output voltage correction signal increments have sufficient granularity and a sufficient update frequency (e.g. at least every 10-20 ms) to track a user's movements.

Speeding up the distance change detection using the transmitter output voltage measurement can have significant benefits in hazardous environments where a time between detecting that a user is too close and the user could actually touch a hazardous device can be too short for an R-bank/C-bank tuning device to give sufficient warning to the user.

Note, while example embodiments discussed herein refer to a "user", in alternate embodiments the near-field devices can be coupled to any conductive surface (e.g. a robot, a vehicle, a docking system, a physical coupling system, a position on an assembly line, etc.).

Figure 1:
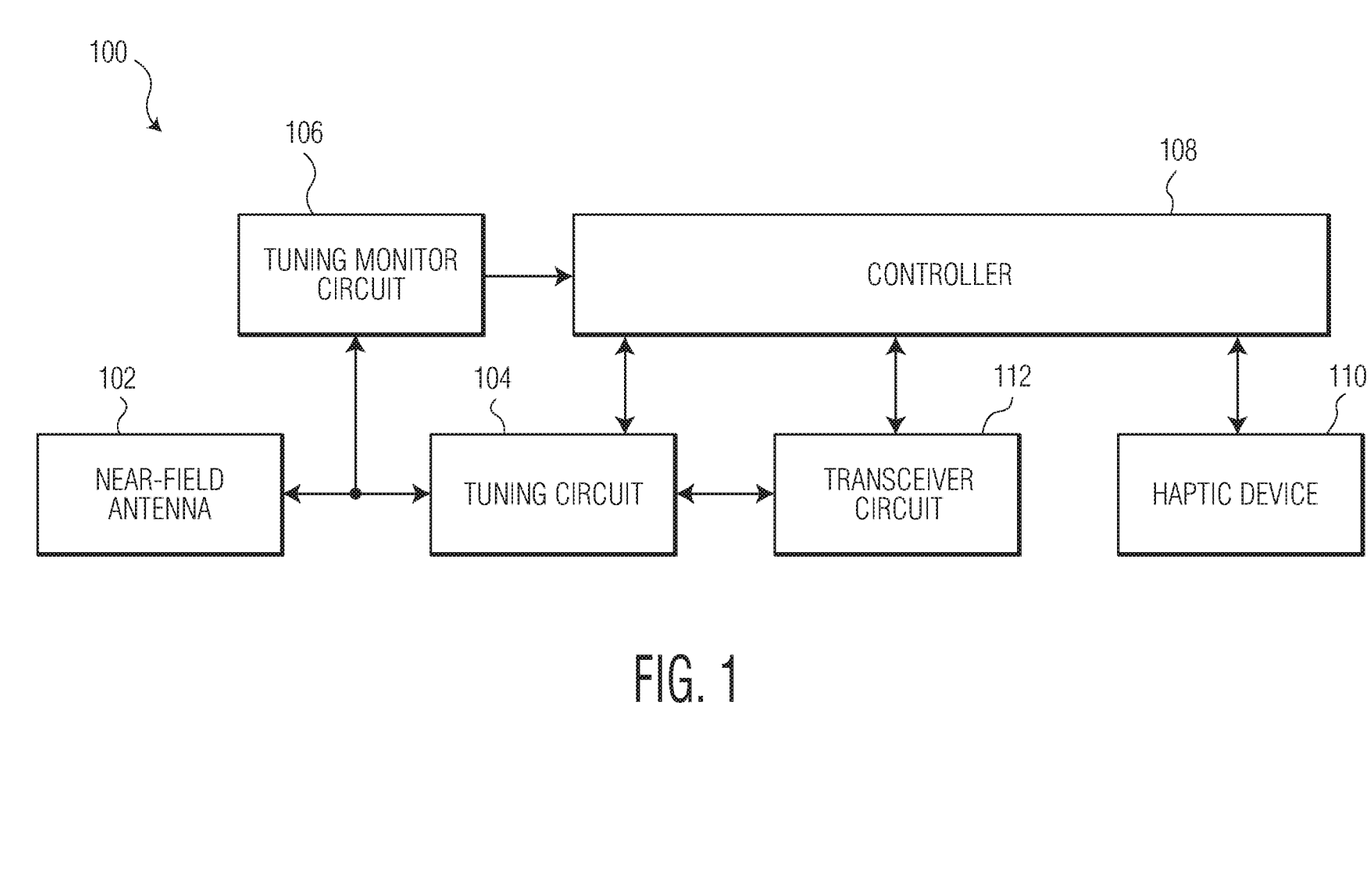
FIG. 1 is an example of a near-field wireless device.

FIG. 1 is an example of a near-field wireless device 100. The example near-field wireless device 100 includes a near-field antenna 102, a tuning circuit 104, a tuning monitor circuit 106, a controller 108, a haptic device 110 and a transceiver circuit 112. An example of the near-field antenna 102 is presented and discussed in FIG. 2. The transceiver circuit 112 is configured to adjust the device's 100 transmitter output voltage using the controller 108. The tuning circuit 104 is configured to adjust the device's 100 resonance frequency using a capacitive bank (C-bank), and bandwidth using a resistive bank (R-bank) in response to signals from the controller 108. The C-bank and R-bank discretes are in some examples about 130 pF and 5000 ohms respectively to support the required resonance frequency (e.g. 10.3 MHz) and bandwidth (e.g. 400 KHz).

The tuning monitor circuit 106 is configured to monitor the transmitter output voltage, the C-bank, and the R-bank values which are then passed to the controller 108.

The controller 108 is configured to adjust (e.g. increment/decrement) the transmitter output voltage using the transceiver circuit 112, and adjust the C-bank and R-bank values using the tuning circuit 104. The controller 108 is also configured to receive the transmitter output voltage from the tuning monitor circuit 106 and calculate a distance of either the near-field wireless device 100 or a user coupled to the wireless device 100 from a conductive surface.

In some example embodiments the distance calculated by the controller 108 can be used to drive the haptic device 110. The haptic device 110 in some examples is coupled to the user (e.g. physical coupling, audio coupling, electrical coupling, etc.) to provide haptic feedback of some sort (e.g. a haptic signal having an amplitude, frequency and/or pattern thereof) as the user approaches, retreats from, or touches various conductive surfaces.

The five main types of haptic feedback technologies (haptics) are force, vibrotactile, electro-tactile, ultrasound and thermal feedback. The best-known example of haptic technology are the devices that create vibrations in a mobile phone classifying as vibrotactile feedback. Vibrotactile stimulators apply pressure to human skin receptors. Such haptic feedback enables users to feel clicks, vibrations and other tactile input providing the user with many kinds of touch sensations.

In some example embodiments, haptic feedback can be provided when a user is subjecting the near-field device 100 (e.g. a wearable) to an "unsupported" (e.g. an incorrectly worn near-field device and/or a loss of signal with other near-field devices) condition in which the near-field device's 100 performance degrades. For example, in the case of an NFEMI wearable wristband, an unsupported condition can be when the wristband containing the near-field device is not being worn correctly by a user. Another unsupported condition can be when the wristband is brought behind the user's back.

In other example embodiments, haptic feedback can be provided to alert a user in a hazardous/industrial environment as the user approaches or becomes too close to certain hazardous/industrial structures. Thus based on how close the user is to the conductive interface the level of haptic feedback can be varied (e.g. far from the surface results in a minor vibration, while very close by yields more intense vibration).

Figure 2:
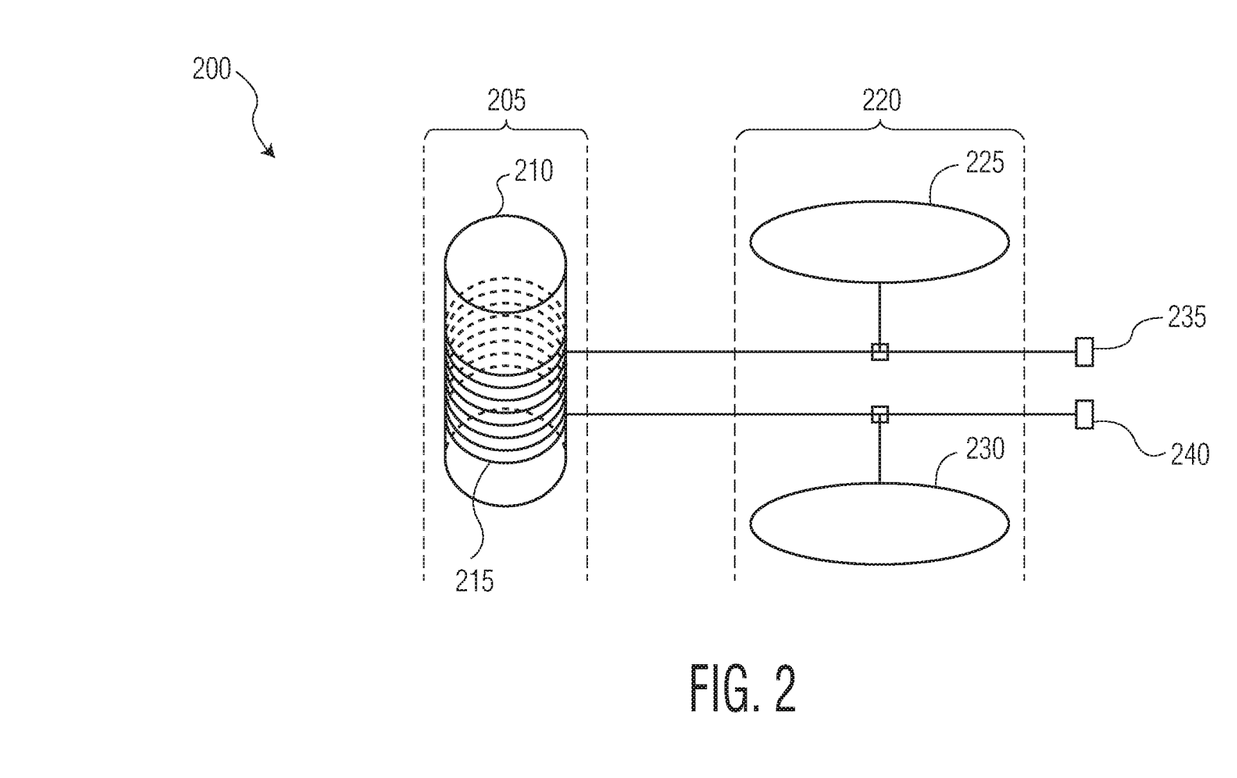
FIG. 2 is an example of a near-field antenna in the wireless device.

FIG. 2 is a first example of a near-field antenna 200 in the wireless device 100. In this example the antenna 200 is a near-field electromagnetic induction (NFEMI) antenna. In some example embodiments, the antenna 200 includes a coil (H-field) antenna 205 for magnetic fields, in conjunction with a short loaded dipole (E-field) antenna 220 for electric fields. The H-field antenna 205 includes a ferrite core 210 wound with wire 215. The E-field antenna 220 includes two conductive loading surfaces 225 and 230. Antenna 200 feed points 235, 240 are coupled to various transceiver circuitry, such as a downstream radio transmitter and receiver integrated circuit (RF-IC), (not shown here). The antenna 200 can be tuned to resonate at a communication frequency by means of reactance components that are integrated in the RF-IC. The antenna's 200 bandwidth can similarly be tuned using the reactance components.

When the NFEMI antenna 200 is proximate to a conductive structure (e.g. a structure having one or more conductive surfaces, a body, a person, an object, etc.) the magnetic and electric fields will be substantially confined to the conductive surface and not significantly radiate in free-space. This enhances security and privacy of such body networked communications.

In various example embodiments, the antenna 200 operates at or below 50 MHz (e.g. for example at 30 MHz) to ensure that the fields are following the conductive surface's contours and to ensure that far field radiation is strongly reduced.

Figure 3A:
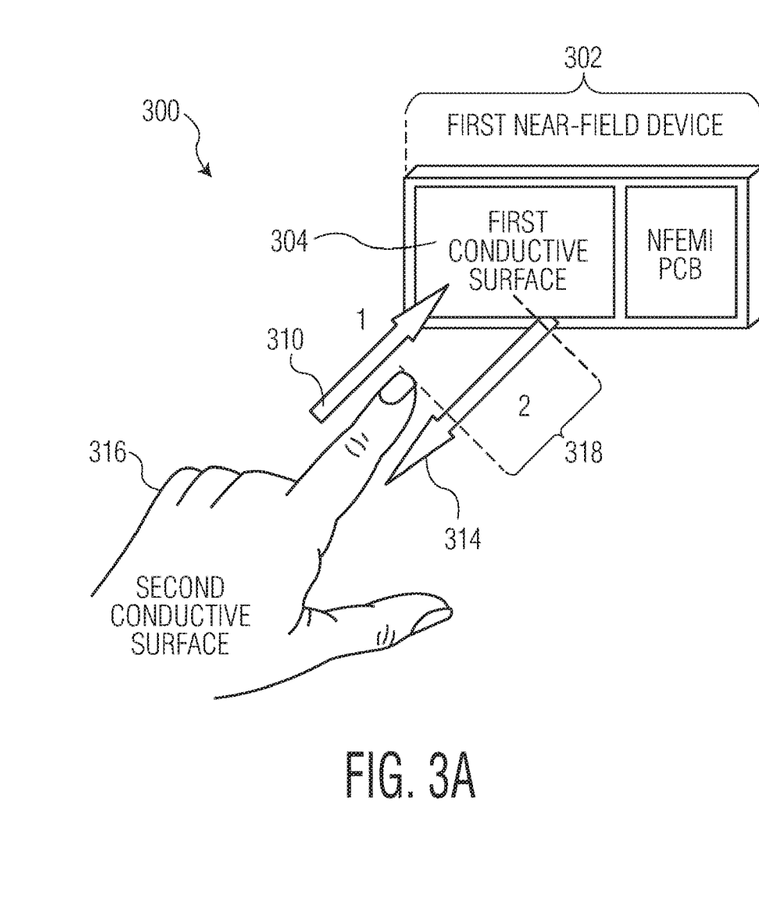
FIG. 3A is a first example of a first near-field device on a first surface at a varying distance from a second surface.

FIG. 3A is a first example 300 of a first near-field device 302 comprised of a first conductive surface 304 at a varying distance 318 from a second conductive surface 316. The first conductive surface 304 can be part of an NFEMI antenna 200. In the example 300 movements are shown as an approaching (Phase 1) 310 out of plane to the second conductive surface 316, and a retreating (Phase 2) 314 also out of plane to the second conductive surface 316. At any moment in time the distance 318 of the first conductive surface 304 to the second conductive surface 316 (e.g. a user's finger) is shown.

Figure 4:
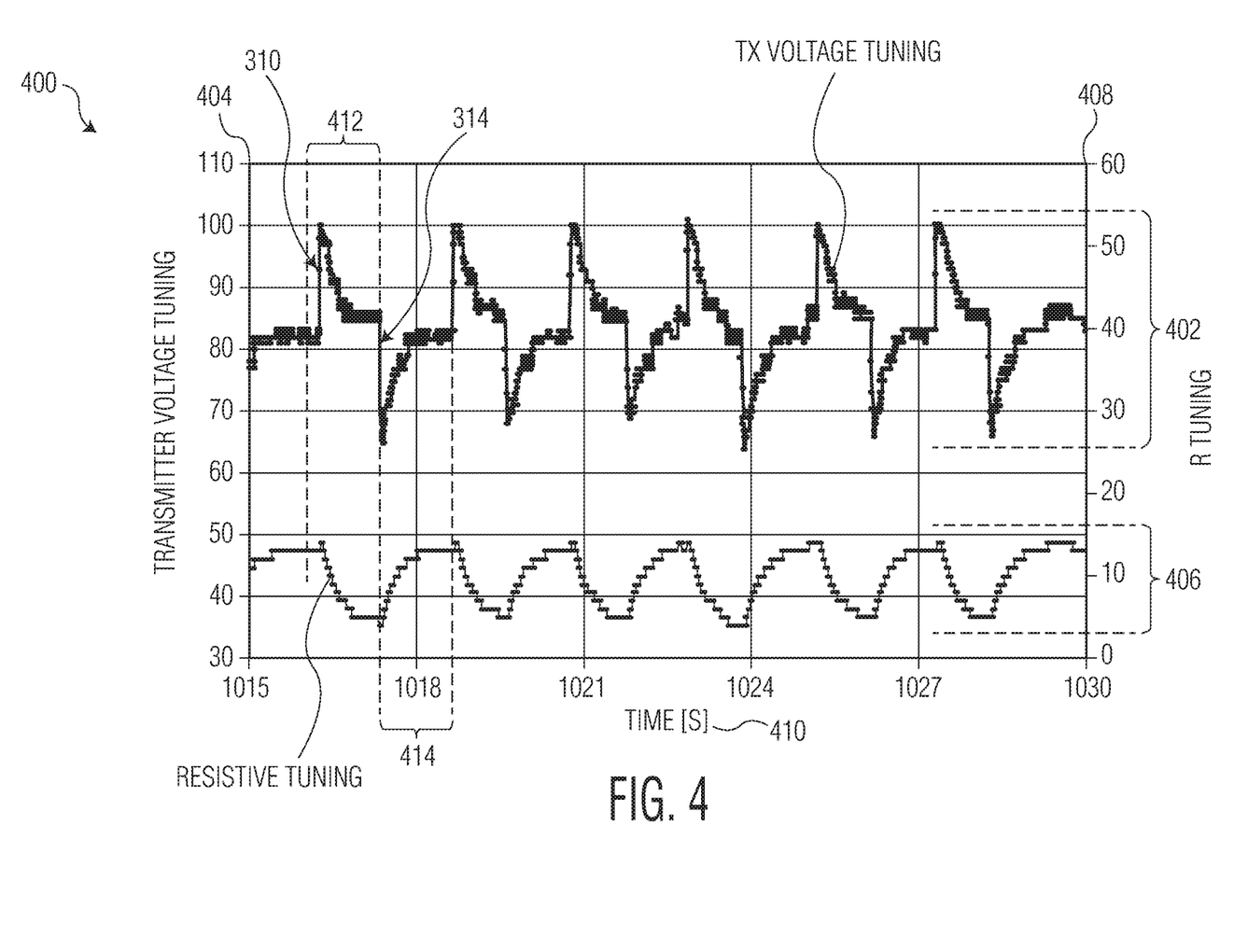
FIG. 4 is an example set of transmitter output voltage correction signal values for the first example of FIG. 3A.

In this example 300 a user's finger on their left hand (i.e. the second surface 316) is approaching the, then moving away from the first conductive surface 304. This sequence of movements is repeated for 6 times, an example of which is shown in FIG. 4. As the user's finger approaches and moves away from the first conductive surface 304, the controller 108 adjusts the transmitter output voltage correction signal and calculates the instantaneous distance 318 from the transmitter output voltage correction signal.

In some example embodiments, one of the near-field antenna's 200 conductive surfaces 225, 230 (see FIG. 2) is positioned to face the user's finger and the other is oriented towards the environment yielding a capacitance between this plate and the environment. Such a capacitance changes by the proximity of the conductive surfaces 225, 230 to various conductive surface, structures and/or objects in the environment such as the second surface 316.

In some example embodiments, the near-field antenna 200 is positioned to face the user's finger, which is part of the second conductive surface 316. Various conductive surface, structures and/or objects in the environment such as the second surface 316, close to the near-field antenna's 200 can introduce additional loss in the antenna and result in a decrease in the quality factor of the antenna 200.

To compensate for these distance 318 changes in some example embodiments, the controller 108 adjusts the transceiver circuit's 112 transmitter amplification based on the transmitter output voltage correction signal so that the transmitter output voltage remains at the target transmitter output voltage.

For example the transmitter output voltage correction signal increases when the distance 318 between the first surface 304 and the second surface 316 decreases during the approaching (Phase 1) 310, and decreases when the distance 318 between the first surface 304 and the second surface 316 increases during the retreating (Phase 2) 314, see FIG. 4.

In other words, when the distance 318 between the first surface 304 and the second surface 316 begins to decrease, the transmitter output voltage correction signal value is initially increased by the controller 108 to maintain a target transmitter output voltage. Then when the distance 318 between the first surface 304 and the second surface 316 stops decreasing and remains constant/fixed, then the transmitter output voltage correction signal value is gradually decreased to maintain the target transmitter output voltage in correspondence to a specific setting of the resistive tuning values. When the distance 318 between the first surface 304 and the second surface 316 begins to increase, then the transmitter output voltage correction signal value is decreased further by the controller 108 to maintain a target transmitter output voltage.

In example embodiments of the first near-field device 302 that include a controller, the controller can be configured to record a set of distances within a time period, and output an authentication signal if the set of distances corresponds to a stored set of distances. In various example embodiments the authentication signal can: activate an electronic device, permit entry to a secure space, indicate that a procedure has been correctly followed, indicate that a quality assurance procedure has been performed, etc.

The controller can also be configured to output an boundary breached (e.g. alert, haptic, etc.) signal if the distance 318 is less than a predetermined distance 318. The boundary breached signal can cause an acoustic and/or haptic signal to be generated that has an amplitude and/or frequency modulated by the distance 318. The controller can also be configured to generate a visual cue modulated by the distance 318.

Figure 3B:
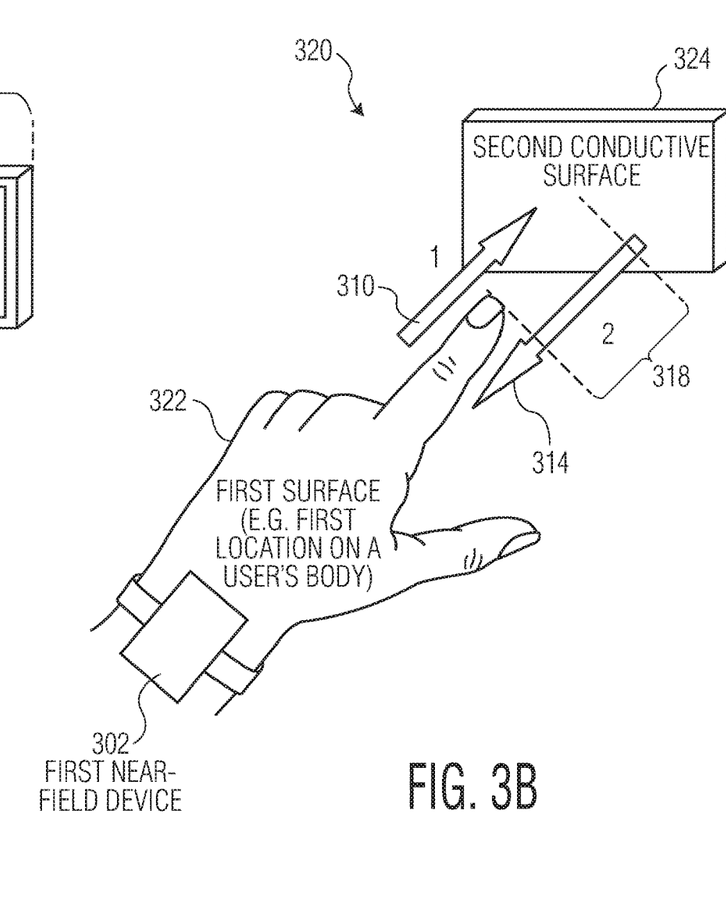
FIG. 3B is a second example of the first near-field device on a first surface at a varying distance from a second surface.

FIG. 3B is a second example 320 of the first near-field device 302 on a first surface 322 (e.g. a particular user's hand-finger configuration) at a varying distance 318 from a second surface 324. In this example 320 operation is substantially similar to that discussed in FIG. 3A except here the first surface 322 with the first near-field device 302 is approaching (Phase 1) 310 and retreating (Phase 2) 314 from the second surface 324.

FIG. 4 is an example 400 set of transmitter output voltage correction signal values 402 for the first example 300 of FIG. 3A. In this example 400 an approaching (Phase 1) 310, and a retreating (Phase 2) 314 are shown. The x-axis is time 410 in seconds and the primary y-axis 404 is the setting of the transmitter output voltage correction signal value 402 of the near-field device 100. The secondary y-axis 408 is the setting of the R-bank value 406 (i.e. resistance) in the tuning circuit 104 in FIG. 6.

The recorded data of 15 seconds is composed of six similar approaching (Phase 1) 310 and then retreating (Phase 2) 314 sequences of each approximately 2.5 s in duration.

When approaching (Phase 1) 310 the second conductive surface 316, the transmitter output voltage correction signal value 402 is increasing from setting 83 to setting 98 (i.e. 15 tuning steps) in about 20 ms until when the first conductive surface 304 becomes in galvanic contact with the second conductive surface 316, which is defined as a start of a touch period 412.

When retreating (Phase 2) 314 from the second conductive surface 316 during a retreating from touch period 414, the transmitter output voltage correction signal value 402 decreases from setting 86 to setting 69 in 50 ms.

In example 400, the transmitter output voltage correction signal value 402 spikes UP upon an onset of the touch period 412, before ramping back down during the touch period 412. The transmitter output voltage correction signal value 402 then spikes DOWN upon an onset of the retreating from touch period 414, before ramping back up during the retreating from touch period 414.

Touch is herein defined as including actual galvanic contact, but also including examples where the first and second conductive surfaces 304, 316 are close but not actually touching, such as being separated by a thin dielectric.

The faster response time of transmitter output voltage correction signal value 402 with respect to the R-bank values 406 is now discussed. For the example 400, the transmitter output voltage correction signal value 402 increased with 15 tuning steps in approximately 20 ms during the approaching phase 310 to a setting 98 at the start of the touch period 412. In contrast, the R-bank value 406 is decreasing with 8 steps in 560 ms from the start of the touch period 412.

If define that 10% change in tuning parameter is significant to determine touching, then a 10% change in transmitter output voltage correction signal value 402 would be observed within less than 10 ms. A 10% change of the R-bank value 406 would be observed after more than 100 ms. So compared to the other tuning parameters such as variable (tuning) resistor, the transmitter voltage tuning is 100 times faster to detect touching in this implementation of the tuning algorithm and in this example 400.

For the example 400, after the touch period 412 and during the retreating from touch period 414, the transmitter output voltage correction signal value 402 decreases with 21 tuning steps in approximately 80 ms, whereas the R-bank value 406 is decreasing with 8 steps in 700 ms during the retreating from touch period 414.

If define again that 10% change in tuning parameter is significant to determine retreating, then a 10% change in the transmitter output voltage correction signal value 402 would be observed in approximately 30 ms. A 10% change of the R-bank value 406 would not be enough since the R-bank value 406 is low when the near-field device 100 is touched (e.g. 5) so in order to be significant choose here a delta in the R-bank value 406 of 2 steps. Such delta would be observed after more than 100 ms. So compared to the R-bank value 406, the transmitter output voltage correction signal value 402 is over three times faster to detect retreating in this implementation of the tuning algorithm and in this example 400.

Figure 5A:
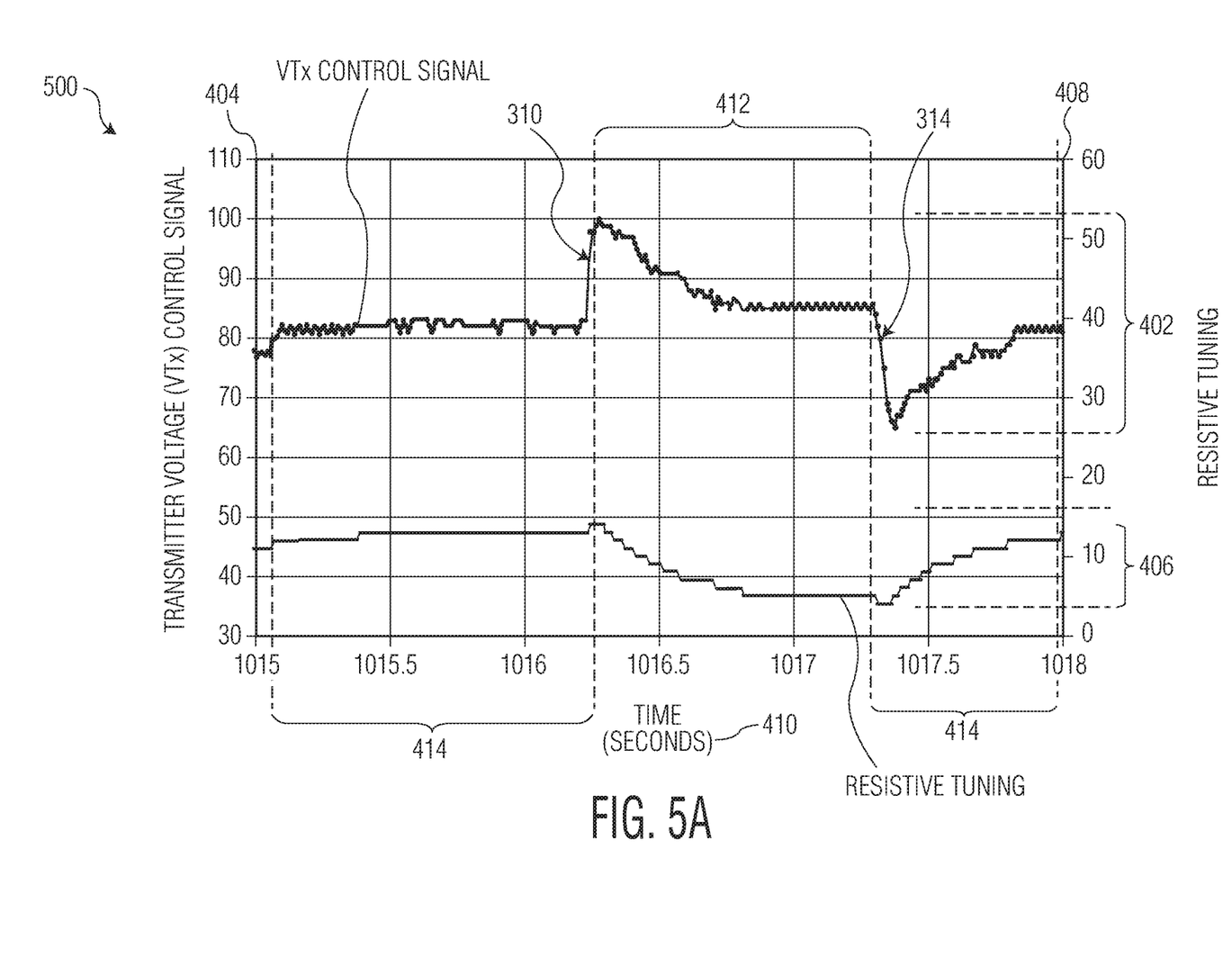
FIG. 5A is an example portion of the set of transmitter output voltage correction signal values of FIG. 4.

FIG. 5A is an example portion 500 of the set of transmitter output voltage correction signal values 402 and the setting of the R-bank value 406 of FIG. 4.

Figure 5B:
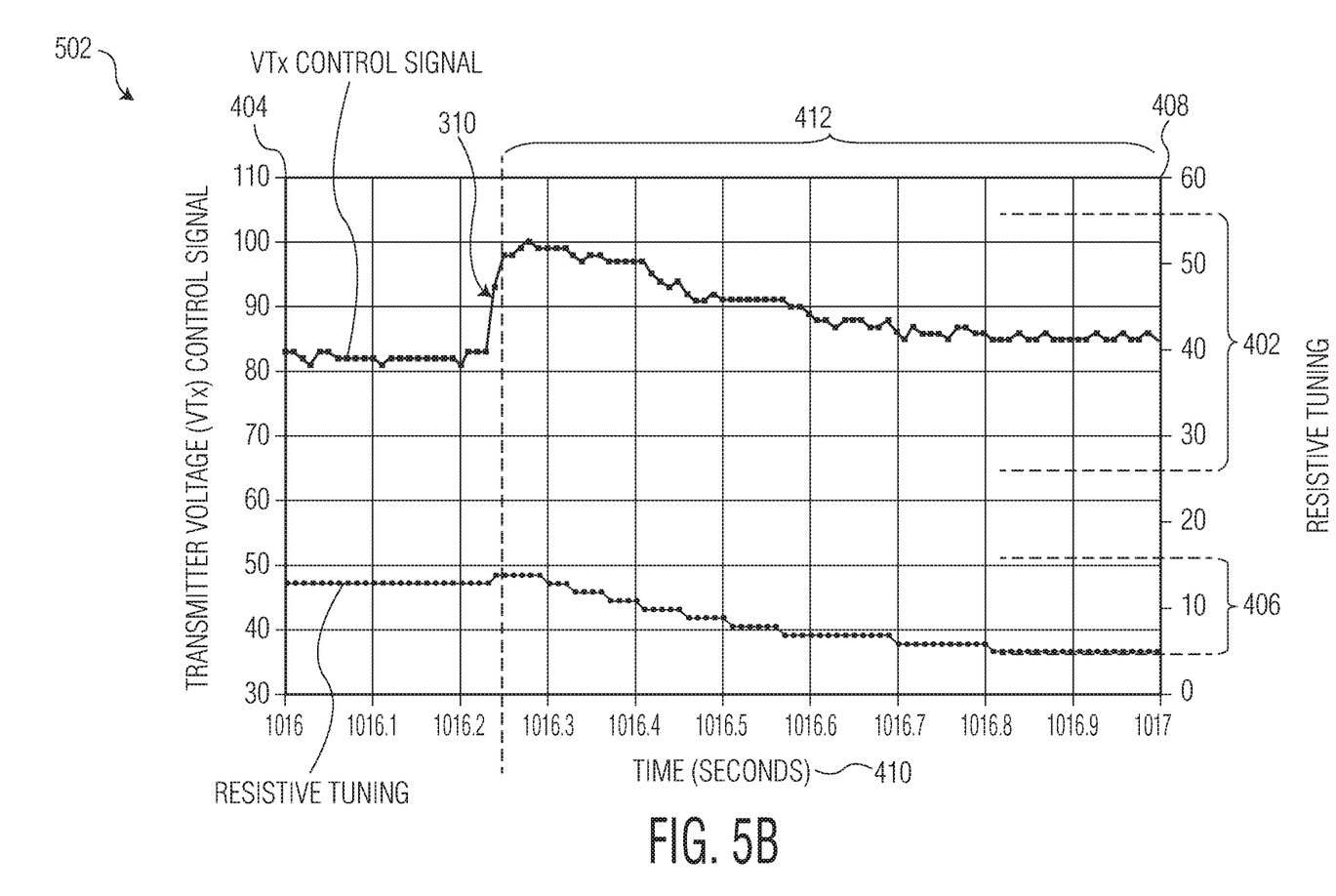
FIG. 5B is an example portion of the set of transmitter output voltage correction signal values of FIG. 5A.

FIG. 5B is an example portion 502 of the set of transmitter output voltage correction signal values 402 and the setting of the R-bank value 406 of FIG. 5A.

Figure 6:
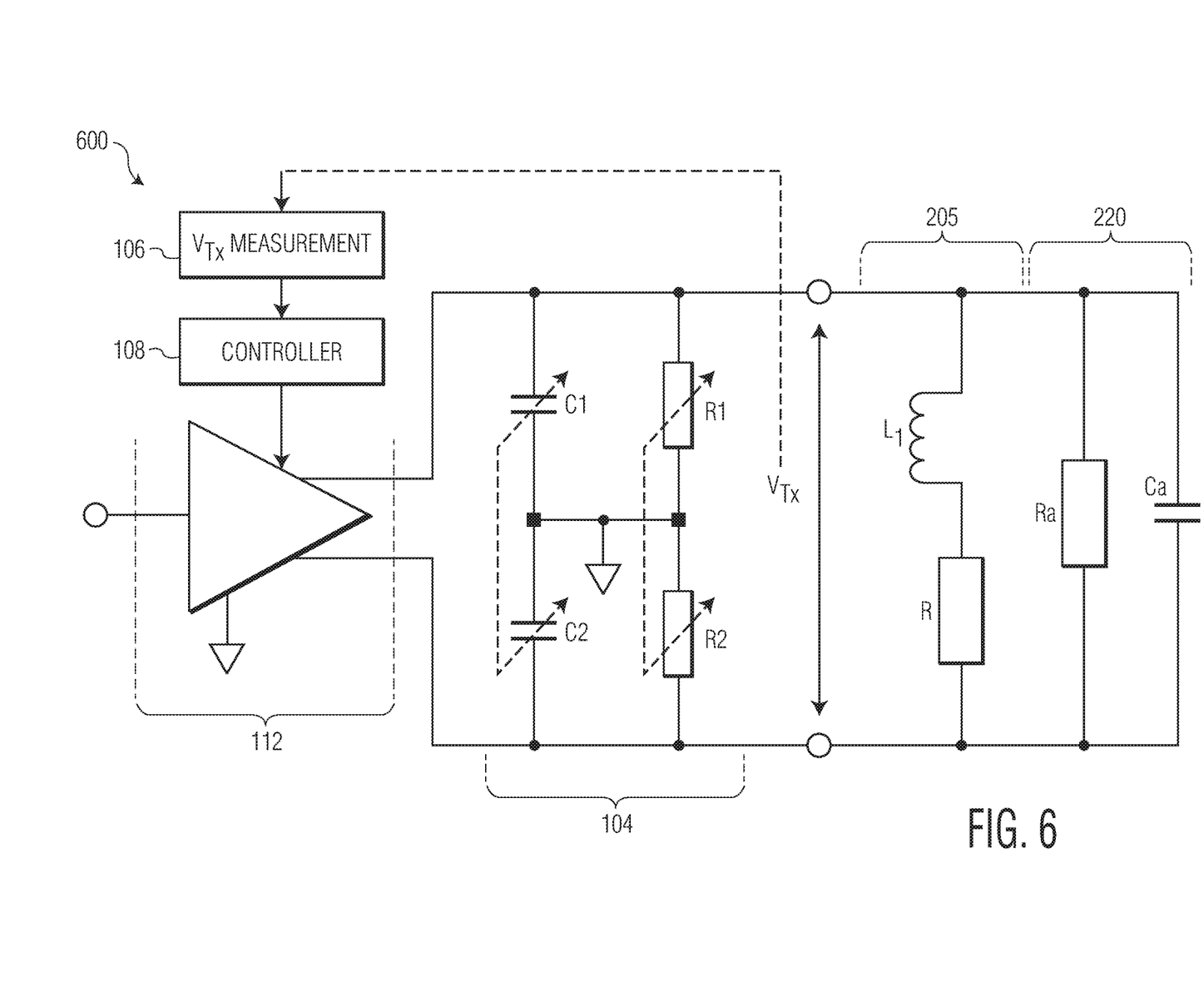
FIG. 6 is an example circuit diagram of the near-field wireless device in FIG. 1.

FIG. 6 is an example circuit diagram 600 of the near-field wireless device in FIG. 1. The example circuit 600 includes the coil (H-field) antenna 205, the short loaded dipole (E-field) antenna 220, the tuning circuit 104 with the R-bank and C-bank, the tuning monitor circuit 106 configured to monitor the transmitter output voltage (VTx), the controller 108, and the transceiver circuit 112 configured to receive the transmitter output voltage correction signal from the controller 108.

L1 presents the inductance of the coil (H-field) antenna 205 and R presents its loss while Ca presents the capacitance of the short loaded dipole (E-field) antenna 220 and Ra its loss. Both antennas are together resonance tuned at the communication frequency, for example 10.6 MHz, with the variable capacitors C1 and C2. Variable loading resistors R1 and R2 are tuned for the required communication bandwidth, for example 400 KHz.

During the last 20 ms of the approaching phase 310 until the start of the touch period 412, when additional loss is introduced to the system, the quality factor of the system drops and the tuning resistor setting (R1 and R2) has to be adapted to restore the correct bandwidth. The tuning resistor setting has to be lowered then for correct bandwidth but this requires an iterative tuning algorithm to be run through. This algorithm uses a dedicated tuning signal composed of three tones that are applied to and measured by the system sequentially. This algorithm delivers the control signal for R1 and R2 (dotted arrows in FIG. 6).

Since the resistor setting is not instantaneously adjusted, the transmitted voltage, VTx, is too low as the overall equivalent parallel resistor of the system (=combination of R1, R2, R and Ra) is too low. The transmitter voltage setting needs to be adjusted such that the target transmitter output voltage can be guaranteed.

This transmitter voltage setting is retrieved as follows: VTx is measured which is the amplitude of the communication signal (at for example 10.6 MHz in a bandwidth of 400 kHz), as this value will be too low, the controller 108 will adapt the setting such that VTx is again at the target output voltage level. This tuning loop requires only one measurement of the communication signal present.

Next the resistor settings are then iteratively adapted during the touch period 412 to settle at a lower resistive tuning setting, allowing also the transmitter output voltage correction signal 402 to be adapted and to settle back to a lower correction setting during the touch period 412.

The explanation is illustrated by the measurement in FIG. 4 where it is shown that adjusting the R-bank value 406 occurs significantly slower than changes in the transmitter output voltage correction signal value 402. So the transmitter output voltage correction signal value 402 is a better parameter to monitor for detecting—in the order of milliseconds—when an NFEMI device is sufficiently close to a conductive medium.

Various instructions and/or operational steps discussed in the above Figures can be executed in any order, unless a specific order is explicitly stated. Also, those skilled in the art will recognize that while some example sets of instructions/steps have been discussed, the material in this specification can be combined in a variety of ways to yield other examples as well, and are to be understood within a context provided by this detailed description.

In some example embodiments these instructions/steps are implemented as functional and software instructions. In other embodiments, the instructions can be implemented either using logic gates, application specific chips, firmware, as well as other hardware forms.

When the instructions are embodied as a set of executable instructions in a non-transitory computer-readable or computer-usable media which are effected on a computer or machine programmed with and controlled by said executable instructions. Said instructions are loaded for execution on a processor (such as one or more CPUs). Said processor includes microprocessors, microcontrollers, processor modules or subsystems (including one or more microprocessors or microcontrollers), or other control or computing devices. A processor can refer to a single component or to plural components. Said computer-readable or computer-usable storage medium or media is (are) considered to be part of an article (or article of manufacture). An article or article of manufacture can refer to any manufactured single component or multiple components. The non-transitory machine or computer-usable media or mediums as defined herein excludes signals, but such media or mediums may be capable of receiving and processing information from signals and/or other transitory mediums.

It will be readily understood that the components of the embodiments as generally described herein and illustrated in the appended figures could be arranged and designed in a wide variety of different configurations. Thus, the detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The present invention may be embodied in other specific forms without departing from its spirit or essential characteristics. The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussions of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment," "an embodiment," or similar language means that a particular feature, structure, or characteristic described in connection with the indicated embodiment is included in at least one embodiment of the present invention. Thus, the phrases "in one embodiment," "in an embodiment," and similar language throughout this specification may, but do not necessarily, all refer to the same embodiment.

What is claimed is:

1. A wireless device, comprising:
   a first near-field device, including a near-field transmitter or receiver and a controller, configured to be coupled to a near-field antenna having a first conductive surface and a set of feed-points;
   wherein the controller is configured to receive a transmitter output voltage from the set of feed-points;
   wherein the controller is configured to generate a correction signal based on a difference between the transmitter output voltage and a target transmitter output voltage;
   wherein the correction signal varies in response to a change in a distance between the first surface and a second conductive surface; and
   wherein the controller is configured to calculate the distance, between the first conductive surface and the second conductive surface, based on the correction signal.

2. The device of claim 1:
   wherein the correction signal increases when the distance between the first surface and the second surfaces decreases; and
   wherein the correction signal decreases when the distance between the first surface and the second surfaces increases.

3. The device of claim 1:
   wherein the controller is configured to adjust the transmitter output voltage based on the correction signal.

4. The device of claim 1:
wherein the first conductive surface is configured to be coupled to a user's body and the second conductive surface is embedded in a device not on the user's body.

5. The device of claim 1:
wherein the second conductive surface is not coupled to any other near-field device.

6. The device of claim 1:
wherein the controller calculates the distance without transmitting or receiving data to or from any other near-field device coupled to the second conductive surface.

7. The device of claim 1:
wherein the near-field device hosts non-propagating quasi-static electric near-field signals; and
wherein the first conductive surface is configured to conduct the non-propagating quasi-static electric near-field signals.

8. The device of claim 1:
wherein the near-field device is configured to transmit or receive a near-field electro-induction (NFEI) signal; and
wherein the near-field transmitter or receiver is configured to either set the near-field resonance frequency or the operational bandwidth of the NFEI signal.

9. The device of claim 1:
wherein the near-field transceiver is configured to transmit or receive a near-field electro-magnetic induction (NFEMI) signal; and
wherein the near-field transmitter or receiver is configured to either set the near-field resonance frequency or the operational bandwidth of the NFEMI signal.

10. The device of claim 1:
wherein the first conductive surface is embedded in either a user's body, a vehicle, a game controller, or a robot.

11. The device of claim 1:
wherein the first conductive surface is a position on or proximate to an assembly line.

12. The device of claim 1:
wherein the controller is configured to record a set of the distances within a time period; and
wherein the controller is configured to output an authentication signal if the set of distances corresponds to a stored set of distances.

13. The device of claim 1:
wherein the authentication signal at least one of: activates an electronic device, permits entry to a secure space, indicates that a procedure has been correctly followed, and/or indicates that a quality assurance procedure has been performed.

14. The device of claim 1:
wherein the controller is configured to generate an acoustic signal having an amplitude and/or frequency modulated by the distance.

15. The device of claim 1:
wherein the controller is configured to generate a haptic signal having an amplitude, frequency and/or pattern thereof modulated by the distance.

16. The device of claim 1:
wherein the haptic signal is generated in response to a magnitude of the tuning values exceeding a threshold magnitude.

17. The device of claim 1:
wherein the tuning values include an adjustable capacitance configured to set a near-field resonance frequency of the first near-field device.

18. The device of claim 1:
wherein the tuning values include an adjustable resistance configured to set a transmitter or receiver bandwidth of the first near-field device.

\* \* \* \* \*